Figure 1:
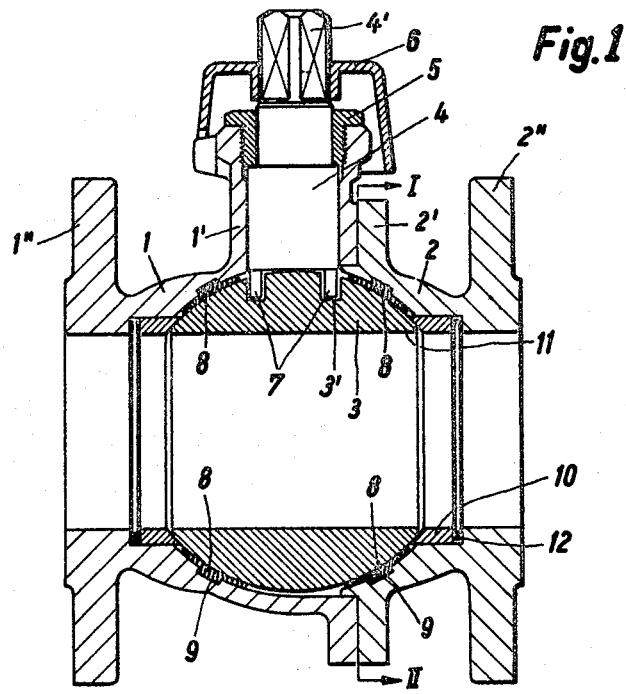

Jan. 26, 1965

R. KAISER 3,167,300

SHUT-OFF COCK WITH SPHERICAL PLUG HAVING
CENTERING BEARING MEANS
Filed June 20, 1961

Inventor:
Rudolf Kaiser,

By Ernest A. ........,
His Attorney.

United States Patent Office 3,167,300
Patented Jan. 26, 1965

3,167,300
SHUT-OFF COCK WITH SPHERICAL PLUG
HAVING CENTERING BEARING MEANS
Rudolf Kaiser, Rohrerweg 18, Ettlingen,
Baden, Germany
Filed June 20, 1961, Ser. No. 118,289
Claims priority, application Germany, July 11, 1960,
N 18,604
2 Claims. (Cl. 251—315)

A shut-off cock having a spherical plug is known, which is held between supporting surfaces which are arranged in the housing and form parts of a spherical surface and which are sealed from the through-flow passage of the plug by piston rings, the said rings being arranged coaxially with the said passage and that end face of the said rings which is remote from the spherical plug being under the pressure of the medium flowing through the shut-off cock. Generally, the cock plug consists of a different material from the cock housing. The latter is made, for example, from cast steel and the former from aluminium or bronze. Practice has shown that during the course of time so-called contact corrosions occur which readily form under the influence of the liquid medium flowing through the shut-off cock. These corrosions can even result in such a condition that the cocks can no longer be operated at all and are therefore unusable.

Bearing rings made from heat-resistant and chemically-resistant synthetic plastic material have already been used in shut-off cocks for centering the completely round plug which is provided with an appropriately shaped recess merely for receiving the end of the control spindle. These bearing rings, arranged coaxially to the throughflow passage of the plug, however, are used at the same time for providing a seal from the plug throughflow passage. This involves the disadvantage that, when the cock is operated, the edges of the plug throughflow passage travel over these rings and consequently damage them prematurely. Particularly when high pressures occur, the entire pressure load of the plug bears on the annular packings and causes the damaging of these rings.

The invention also relates to shut-off cocks having a completely round plug which is centered within the cock housing by bearings made of heat-resistant and chemically-resistant synthetic plastic material. The object of the invention is to eliminate the aforesaid disadvantage, to cheapen the production of these cocks by simplifying their construction, and to avoid any risk of corrosion.

The solution of this problem according to the present invention comprises that the plastic bearings centering the spherical plug are constructed as relatively thin bearing segments which are fixed in the cock housing by means of studs situated at their rear sides and are not contacted by the edges of the throughflow passage of the plug in any position to which the plug is moved, and between which and the plug throughflow passage there are arranged, mounted in axially displaceable fashion in a manner known per se in recesses of the cock housing, piston-type packing rings which bear on the plug surface. This affords the advantage that the bearing segments, which can easily be mounted in the cock housing, are not subjected to any considerable stress since they have not to carry out any sealing task. Sealing is effected by packing rings which are under the pressure of the medium flowing through the shut-off cock and which can be made of metal.

The spherical plug is made of ceramic material, glass or another synthetic plastic material of the corrosion-resistant or chemically resistant type.

Years of experiments with spherical plugs made of ceramic material have shown that porcelain plugs, for example, must be made completely round in order to withstand the mechanical stresses which occur when they are rotated within the cock housing by means of the handle fixed on the control spindle. The porcelain studs made in one piece with the plug became broken very soon owing to the brittleness of porcelain.

The porcelain plugs are worked by means of silicon carbide discs or diamond tools after they have been fired, to an accuracy of about 0.01 mm. After the grinding the spherical surface is lapped and polished, similarly to what is done when manufacturing optical lenses. These operations give the spherical surface such accuracy of roundness that metal annular piston-type packings can be used for sealing the spherical plug.

A considerable advantage of ceramic spherical plugs consists in that their surface is very hard and they cannot be attacked chemically by very many media. They are not electrically conductive and therefore are not subjected to any damage by contact corrosion. Therefore the life of shut-off cock is prolonged if they are provided with porcelain spherical plugs.

Figure 2:
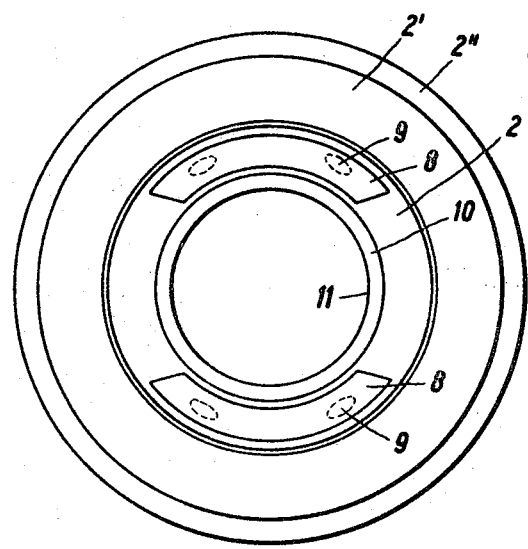

One example of embodiment is shown in the accompanying drawings, in which:

FIGURE 1 shows an axial longitudinal sectional view through the shut-off cock constructed according to the invention, and FIGURE 2 illustrates a side view of the righthand cock housing part in the direction of the arrows I and II shown in FIGURE 1, after the removal of the spherical plug.

The cock housing is composed of the parts 1 and 2 which can be connected to one another by screwing. For the sake of simplicity, this screwed connection is not shown in FIGURE 1. The housing part 1 comprises a guide neck 1' for the mounting of the control spindle 4, and a flange 1" by means of which the cock housing can be connected to a pipeline. An appropriately constructed flange 2" is provided on the houisng part 2. The other flange 2' of the housing part 2 is used for connecting the two aforesaid housing parts. Therefore, the construction of the housing is very simple.

Arranged within the housing is the completely circular spherical plug 3 which can be made, for example, of porcelain. It comprises a throughflow passage 11 and also, at its upper surface, recesses 3' into which the connecting studs 7 of the control spindle 4 engage. The said spindle is provided with a square head 4' which projects out of the housing and on which is fitted a hand lever not shown in the drawings. In order to prevent the penetration of rain water and water of condensation into the guide neck 1' for the control spindle, a synthetic plastic material sleeve 5 made, for example, of polyamide, is screwed into the upper portion of the neck. The abutment cover 6 which is held by the upper square head 4' of the control spindle 4 is used both as a protection against water and also for limiting the angle through which the hand lever (not shown) can be swung.

The mounting and centering of the spherical plug 3 within the cock housing is effected by means of the bearing shells 8 which are made from heat-resistant and chemically-resistant synthetic plastic material. The material used for these bearing shells is to be preferably polytetrafluorethylene, which is commercially obtainable under the trade name "Teflon." The bearing shells 8 comprise at their side remote from the surface of the spherical plug 3, studs 9 which engage in corresponding recesses on the inner periphery of the cock housing. In this way, the bearing shells are mounted in a simple manner within the cock housing.

The sealing of the spherical plug 3 from the housing is effected in known manner by means of metal piston-type packing rings 10, which are mounted to be axially displaceable in recesses of the cock housing parts 1 and 2 co-axially at both sides of the through-flow passage 11 of the plug 3. The end face of the two piston-type packing ring 11 which faces towards the spherical plug 3 forms part of a spherical surface, so that a satisfactory sealing-tightness is guaranteed especially since the rear side of the two piston rings 10 is under the pressure of the medium flowing through the cock. The recesses in the housing parts 1 and 2 for accommodating the piston rings 10 are so large in the axial direction that O-rings 12 can also be arranged at the rear side of the aforesaid piston rings. The annular space formed by the rear side of each piston ring 10 and the shoulder of the recess of the housing parts 1 and 2 is conveniently so dimensioned that the O-ring 12 inserted therein cannot only perform its sealing function but at the same time can also exert an elastic pressure on the aforesaid piston ring in the direction towards the spherical plug 3.

I claim:

1. A shut-off cock comprising a cock housing, a spherical plug valve, a throughflow passage defined in said spherical plug valve, said spherical plug valve being turnable along an axis of rotation disposed perpendicularly to the axis of said throughflow passage, and bearings of heat-resistant and chemically-resistant synthetic plastic material by which the spherical plug valve is centered within the said housing, said bearings being constructed as relatively thin segments disposed in pairs and adjacent each end of said throughflow passage and in planes substantially perpendicular to said axis of rotation, said bearings including studs arranged at the rear sides of said bearings by which said bearings are fixed in the housing and being of an extent without contacting the edges of the spherical plug valve during use, and piston-type packing rings arranged between each pair of said segments and the end of the throughflow passage of the spherical plug valve which bear on the plug valve surface and are mounted for axial displacement in recesses in the cock housing.

2. A shut-off cock as claimed in claim 1, in which a recess is provided in the plug for accommodating the end of a control spindle.

References Cited in the file of this patent

UNITED STATES PATENTS

| 2,912,219 | Clade | Nov. 10, 1959 |
| 2,919,886 | Hurst | Jan. 5, 1960 |
| 2,929,606 | Kaiser | Mar. 22, 1960 |
| 2,986,374 | Rakus | May 30, 1961 |
| 3,041,036 | McFarland | June 26, 1962 |
| 3,056,418 | Adams | Oct. 2, 1962 |

FOREIGN PATENTS

| 619,659 | Germany | Oct. 5, 1935 |
| 915,764 | Germany | July 29, 1954 |
| 716,610 | Great Britain | Oct. 13, 1954 |